United States Patent
Holliday

(10) Patent No.: US 9,654,704 B2
(45) Date of Patent: May 16, 2017

(54) APPARATUS AND METHOD FOR MULTISPECTRAL IMAGING WITH THREE DIMENSIONAL OVERLAYING

(71) Applicant: InfraRed Integrated Systems, Ltd., Northampton (GB)

(72) Inventor: Stuart Holliday, Northampton (GB)

(73) Assignee: InfraRed Integrated Systems, Ltd., Northampton (GB)

( * ) Notice: Subject to any disclaimer, the term of this patent is extended or adjusted under 35 U.S.C. 154(b) by 0 days.

(21) Appl. No.: 14/208,563

(22) Filed: Mar. 13, 2014

(65) Prior Publication Data

US 2014/0346359 A1  Nov. 27, 2014

Related U.S. Application Data

(60) Provisional application No. 61/791,515, filed on Mar. 15, 2013.

(30) Foreign Application Priority Data

Mar. 15, 2013  (GB) .................................. 1304822.8
Mar. 15, 2013  (GB) .................................. 1304826.9

(51) Int. Cl.
   *G01J 5/02*    (2006.01)
   *H04N 5/33*    (2006.01)
   *G06T 5/50*    (2006.01)
   *G01J 5/10*    (2006.01)
   *G01J 1/42*    (2006.01)
   (Continued)

(52) U.S. Cl.
   CPC ................ *H04N 5/332* (2013.01); *G01J 1/42* (2013.01); *G01J 5/10* (2013.01); *G06T 5/50* (2013.01); *H04N 5/2258* (2013.01); *H04N 5/23229* (2013.01); *H04N 5/265* (2013.01); *H04N 13/0011* (2013.01); *H04N 13/0239* (2013.01);
   (Continued)

(58) Field of Classification Search
   CPC ....................................................... H04N 5/332
   See application file for complete search history.

(56) References Cited

U.S. PATENT DOCUMENTS 4,679,068 A    7/1987  Lillquist et al.
6,323,941 B1 *  11/2001  Evans ................... G01S 17/023
                                                250/339.02
(Continued)

FOREIGN PATENT DOCUMENTS

EP    1453010 A2    9/2004
JP    2006060425    3/2006
WO    2012-073722 A1    6/2012

OTHER PUBLICATIONS

Extended Search Report for EP Application No. 14160309.2 dated Jun. 4, 2014, 7 pages.
(Continued)

*Primary Examiner* — Edwin Gunberg
(74) *Attorney, Agent, or Firm* — Fredrikson & Byron, P.A.

(57) ABSTRACT

An apparatus and a method for multispectral imaging comprising, representation generator arranged to generate a three dimensional representation of a scene, at least one infrared imaging sensor arranged to obtain an infrared image of the scene, and an image overlaying processor arranged to overlay the infrared image onto the three dimensional representation of the scene to produce an infrared three dimensional representation of the scene.

28 Claims, 7 Drawing Sheets

(51) Int. Cl.
H04N 5/225 (2006.01)
H04N 13/00 (2006.01)
H04N 5/265 (2006.01)
H04N 13/02 (2006.01)
H04N 5/232 (2006.01)
G01J 5/00 (2006.01)

(52) U.S. Cl.
CPC .. *G01J 2005/0077* (2013.01); *H04N 13/0242* (2013.01); *H04N 2013/0081* (2013.01)

(56) References Cited

U.S. PATENT DOCUMENTS

| | | |
|---|---|---|
| 2004/0169617 A1* | 9/2004 | Yelton et al. .................. 345/1.1 |
| 2005/0078865 A1 | 4/2005 | Criminisi et al. |
| 2006/0061566 A1* | 3/2006 | Verma et al. ................. 345/419 |
| 2009/0010495 A1 | 1/2009 | Schamp et al. |
| 2010/0245387 A1 | 9/2010 | Bachelder et al. |
| 2013/0250070 A1 | 9/2013 | Takayama |
| 2014/0313343 A1* | 10/2014 | Frank ....................... H04N 5/33 348/164 |

OTHER PUBLICATIONS

Qu, Zhaohui, et al., "An Infrared Texture Mapping Approach Based on Binocular Structured Light System," 2009 International Conference on Future BioMedical Information Engineering, 4 pages.
Machine Translation of JP2006060425, Publication Date: Mar. 2, 2006, 22 pages.
Communication Pursuant to Article 94(3) EPC for EP Application No. 14160234.2-1902; Date of Mailing: Mar. 10, 2017; 6 pages.

* cited by examiner

Fig. 1
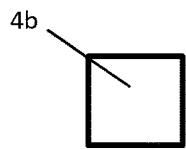
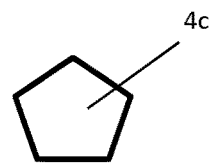
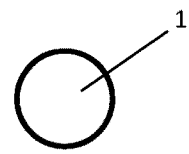
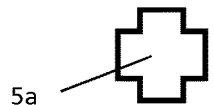
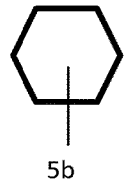
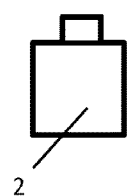
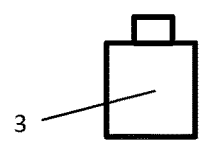

Fig. 2
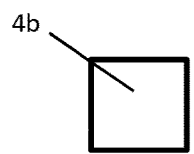
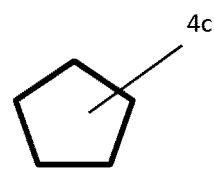
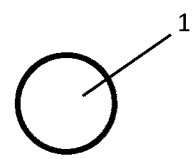
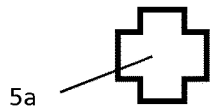
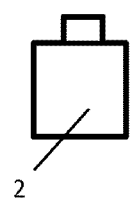
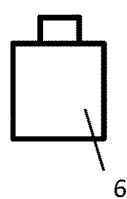
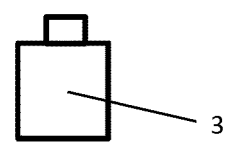

Fig. 5
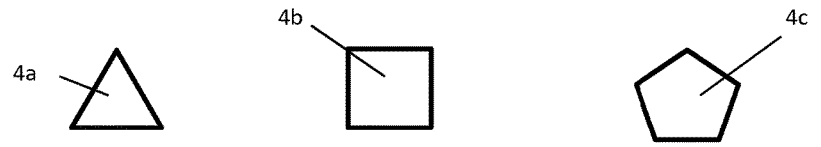
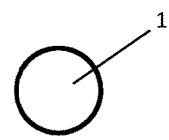
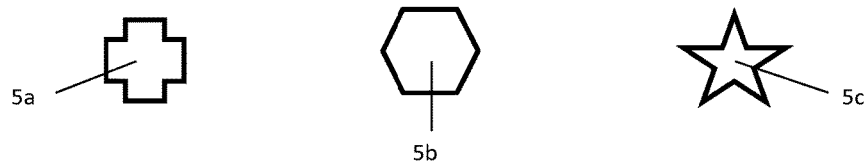
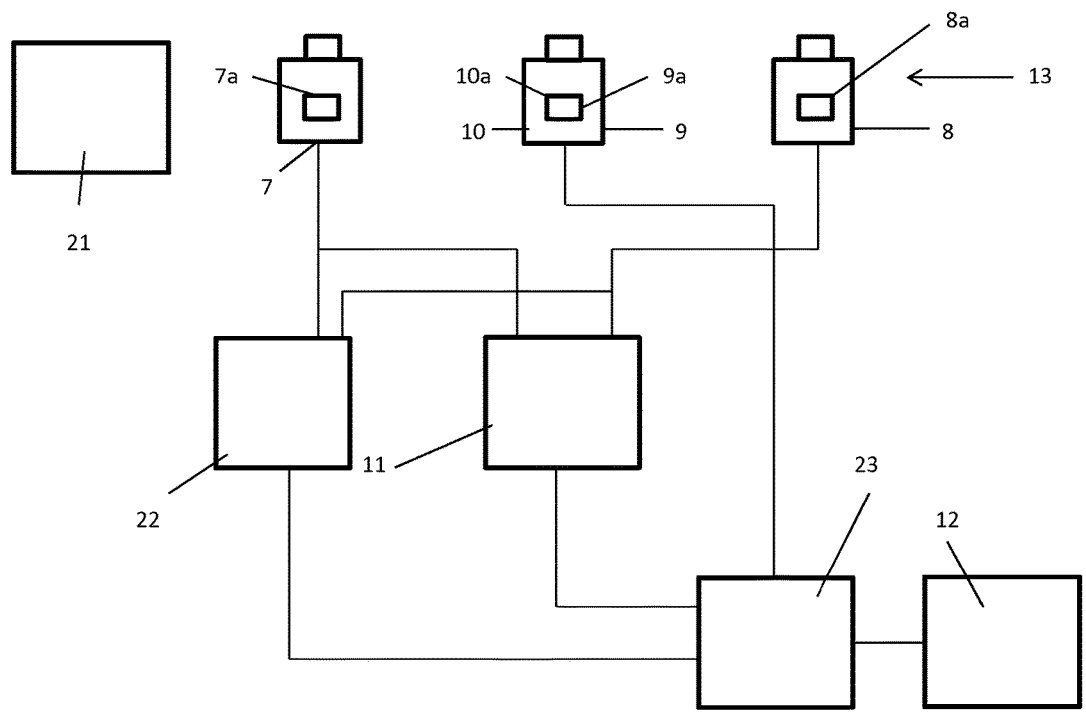

APPARATUS AND METHOD FOR MULTISPECTRAL IMAGING WITH THREE DIMENSIONAL OVERLAYING

PRIORITY CLAIM

This application claims the benefit of U.S. Provisional Application No. 61/791,515, filed Mar. 15, 2013, the content of which is hereby incorporated by reference in its entirety.

TECHNICAL FIELD

The present invention relates to apparatus and methods for multispectral imaging. Certain embodiments relate to methods and apparatus combining visible light and infrared images of a scene to provide a combined multispectral image that has been corrected for parallax. Certain embodiments comprise the three dimensional overlaying of visible light and infrared images of a scene, and in particular apparatus and methods for enhancing the visibility of the displayed thermal information of imaged objects within the scene.

BACKGROUND

Infrared imagery of a scene can be used to provide information not obtainable from visible light imagery, such as temperature information not discernible in visible light imagery.

However, infrared imaging systems frequently operate at lower levels of spatial image resolution to that provided by visible light imaging systems.

To provide a more informative image, infrared and visible light images can be overlaid in order to obtain a resultant combined image. The visible light imagery content can be used to provide clearly recognizable details relating to objects within the scene, and the infrared imagery content can be used to provide further information, such as for example temperature information relating to these objects.

However a problem may be caused because the visible light and infrared (IR) cameras are located at different spatial positions when viewing the scene. As a result the visible and IR cameras will see objects in the scene from different angular positions. This can lead to parallax effects which may cause problems.

Furthermore, the imaged scene can contain a total number of objects with a wide range of temperatures, while an object or objects of interest within the imaged scene may have temperatures that extend over a smaller temperature range. Within the combined visible light and infrared image, or indeed within an infrared image, the effectively displayable contrast across the object or objects of interest is reduced because the displayable contrast range of the infrared display must extend over the entire temperature range of the total number of objects within the imaged scene.

There is furthermore a need to extract as much information from combined visible light and infrared images of a scene, which can be difficult using existing imaging systems where spatial information within the scene may not be discernible or be lacking within captured images.

It is an aim of the present invention to solve these problems.

SUMMARY

In one aspect the invention provides apparatus for imaging, comprising:

a representation generator arranged to generate a three dimensional representation of a scene;

at least one infrared imaging sensor arranged to obtain an infrared image of the scene; and an image overlaying processor arranged to overlay the infrared image onto the three dimensional representation of the scene to produce an infrared three dimensional representation of the scene.

In certain embodiments, the three dimensional representation of the scene is a three dimensional model.

In certain embodiments, the apparatus further comprises at least one visible light imaging sensor arranged to obtain a visible light image of the scene; and wherein the image overlaying processor is arranged to overlay the infrared image and the visible light image onto the three dimensional representation of the scene to produce a multispectral three dimensional representation of the scene.

In certain embodiments, the visible light image and the infrared image are combined to provide a combined multispectral image before being overlaid onto the three dimensional representation of the scene.

In certain embodiments, the apparatus further comprises an image segmentation process arranged to identify objects located at different depths in the scene.

In certain embodiments, objects located at a depth in the scene greater than a first predetermined depth are removed from the representation of the scene.

In certain embodiments, the first predetermined depth is fixed.

In certain embodiments, the apparatus further comprising means to identify an object of interest in the scene, wherein the first predetermined depth is based on the depth in the scene at which an identified object of interest is located.

In certain embodiments, objects located at a depth in the scene smaller than a second predetermined depth are removed from the representation of the scene.

In certain embodiments, the second predetermined depth is fixed.

In certain embodiments, the apparatus further comprises means to identify an object of interest in the scene, wherein the second predetermined depth is based on the depth in the scene at which an identified object of interest is located.

In certain embodiments, the image overlaying processor is arranged to selectively overlay the infrared image onto objects in dependence on the depths at which the objects are located in the three dimensional representation of the scene.

In certain embodiments, the image overlaying processor is arranged to selectively overlay the infrared image only onto objects located at predetermined depths in the three dimensional representation of the scene.

In certain embodiments, the predetermined depths are fixed.

In certain embodiments, the apparatus further comprises means to identify an object of interest in the scene, wherein the predetermined depths are a range of depths extending to either side of the location of an identified object of interest.

In certain embodiments, the range of depths are centred on the location of an identified object of interest.

In certain embodiments, the apparatus further comprises means to identify an object in the scene, wherein the identified object is removed from the representation of the scene.

In certain embodiments, the at least one visible light imaging sensor comprises at least two spaced apart imaging sensors arranged to form a cyclopean camera arrangement; and the apparatus further comprises an image combiner arranged to combine images from the at least two spaced apart imaging sensors to provide a first cyclopean image of a scene from a first virtual position.

In certain embodiments, the at least one infrared imaging sensor provides a second image of the scene from a second position; and the first virtual position and the second position of the at least one infrared imaging sensor are arranged to be substantially the same.

In certain embodiments, the at least one infrared imaging sensor comprises an image sensor element, wherein the first cyclopean image from the cyclopean camera arrangement appears to be generated on a virtual image sensor element within a virtual camera, and wherein the image sensor element of the at least one infrared imaging sensor is positioned at the spatial position of the virtual image sensor element of the virtual camera.

In certain embodiments, the at least one infrared imaging sensor is located between the two spaced apart imaging sensors.

In certain embodiments, the at least one infrared imaging sensor is located at an equal distance from each of the two spaced apart imaging sensors.

In certain embodiments, the two spaced apart imaging sensors are housed within separate housings.

In certain embodiments, the at least one infrared imaging sensor is separate from each of the housings for the two spaced apart imaging sensors.

In certain embodiments, the at least one infrared imaging sensor and the two spaced apart imaging sensors are all comprised within a common housing.

In certain embodiments, the representation generator comprises a processor which compares the images from the at least two spaced apart imaging sensors and uses stereoscopic techniques to determine the depths and/or distances In certain embodiments, the representation generator comprises a structured light scanner.

In certain embodiments, the at least one visible light imaging sensor views structured light projected by the structured light scanner and provides information regarding the viewed structured light to the representation generator.

In certain embodiments, the visible light image and infrared image are presented at substantially the same level of magnification when being combined to provide the combined multispectral image.

In certain embodiments, overlaying the infrared image onto the three dimensional representation of the scene comprises raycasting the visible image onto the three dimensional representation of the scene.

In certain embodiments, overlaying the visible light image onto the three dimensional representation of the scene comprises raycasting the visible light image onto the three dimensional representation of the scene.

In certain embodiments, overlaying the combined image onto the three dimensional representation of the scene comprises raycasting the combined image onto the three dimensional representation of the scene.

In certain embodiments, the first image and second image are provided to the image combiner at substantially the same level of magnification.

In certain embodiments, the infrared image is at least one of: the thermal infrared wavelength range, the mid infrared wavelength range, the near infrared wavelength range, and the long infrared wavelength range.

In another aspect the invention provides an imaging method, comprising:

generating a three dimensional representation of a scene using a representation generator;

obtaining an infrared image of the scene using at least one infrared imaging sensor; and overlaying the infrared image onto the three dimensional representation of the scene to produce an infrared three dimensional representation of the scene using an image overlaying processor.

In certain embodiments, the three dimensional representation of the scene is a three dimensional model.

In certain embodiments, the method further comprises obtaining a visible light image of the scene using at least one visible light imaging sensor; and using the image overlaying processor to overlay the infrared image and the visible light image onto the three dimensional representation of the scene to produce a multispectral three dimensional representation of the scene.

In certain embodiments, the visible light image and the infrared image are combined to provide a combined multispectral image before being overlaid onto the three dimensional representation of the scene.

In certain embodiments, the method further comprises using an image segmentation process to identify objects located at different depths in the scene.

In certain embodiments, objects located at a depth in the scene greater than a first predetermined depth are removed from the representation of the scene.

In certain embodiments, the first predetermined depth is fixed.

In certain embodiments, the apparatus further comprises means to identify an object of interest in the scene, wherein the first predetermined depth is based on the depth in the scene at which an identified object of interest is located.

In certain embodiments, objects located at a depth in the scene smaller than a second predetermined depth are removed from the representation of the scene.

In certain embodiments, the second predetermined depth is fixed.

In certain embodiments, the apparatus further comprises means to identify an object of interest in the scene, wherein the second predetermined depth is based on the depth in the scene at which an identified object of interest is located.

In certain embodiments, the image overlaying processor is arranged to selectively overlay the infrared image onto objects in dependence on the depths at which the objects are located in the three dimensional representation of the scene.

In certain embodiments, the image overlaying processor is arranged to selectively overlay the infrared image only onto objects located at predetermined depths in the three dimensional representation of the scene.

In certain embodiments, the predetermined depths are fixed.

In certain embodiments, the apparatus further comprises means to identify an object of interest in the scene, wherein the predetermined depths are a range of depths extending to either side of the location of an identified object of interest.

In certain embodiments, the range of depths are centred on the location of an identified object of interest.

In certain embodiments, the apparatus further comprises means to identify an object in the scene, wherein the identified object is removed from the representation of the scene.

In certain embodiments, the at least one visible light imaging sensor comprises at least two spaced apart imaging sensors arranged to form a cyclopean camera arrangement; and the method further comprises using an image combiner to combine images from the at least two spaced apart imaging sensors to provide a first cyclopean image of a scene from a first virtual position.

In certain embodiments, the at least one infrared imaging sensor provides a second image of the scene from a second position; and the first virtual position and the second position of the at least one infrared imaging sensor are arranged to be substantially the same.

In certain embodiments, the at least one infrared imaging sensor comprises an image sensor element, wherein the first cyclopean image from the cyclopean camera arrangement appears to be generated on a virtual image sensor element within a virtual camera, and wherein the image sensor element of the at least one infrared imaging sensor is positioned at the spatial position of the virtual image sensor element of the virtual camera.

In certain embodiments, the at least one infrared imaging sensor is located between the two spaced apart imaging sensors.

In certain embodiments, the at least one infrared imaging sensor is located at an equal distance from each of the two spaced apart imaging sensors.

In certain embodiments, the two spaced apart imaging sensors are housed within separate housings.

In certain embodiments, the at least one infrared imaging sensor is separate from each of the housings for the two spaced apart imaging sensors.

In certain embodiments, the at least one infrared imaging sensor and the two spaced apart imaging sensors are all comprised within a common housing.

In certain embodiments, the representation generator comprises a processor which compares the images from the at least two spaced apart imaging sensors and uses stereoscopic techniques to determine the depths and/or distances In certain embodiments, the representation generator comprises a structured light scanner.

In certain embodiments, the at least one visible light imaging sensor views structured light projected by the structured light scanner and provides information regarding the viewed structured light to the representation generator.

In certain embodiments, the visible light image and infrared image are presented at substantially the same level of magnification when being combined to provide the combined multispectral image.

In certain embodiments, overlaying the infrared image onto the three dimensional representation of the scene comprises raycasting the visible image onto the three dimensional representation of the scene.

In certain embodiments, overlaying the visible light image onto the three dimensional representation of the scene comprises raycasting the visible light image onto the three dimensional representation of the scene.

In certain embodiments, overlaying the combined image onto the three dimensional representation of the scene comprises raycasting the combined image onto the three dimensional representation of the scene.

In certain embodiments, the first image and second image are provided to the image combiner at substantially the same level of magnification.

In certain embodiments, the infrared image is at least one of: the thermal infrared wavelength range, the mid infrared wavelength range, the near infrared wavelength range, and the long infrared wavelength range.

BRIEF DESCRIPTION OF THE DRAWINGS

The invention is diagrammatically illustrated by way of example, in the accompanying drawings in which:

FIG. 1 shows a schematic diagram of a scene being imaged by separate visible and infrared cameras;

FIG. 2 shows a schematic diagram of the scene shown in FIG. 1 being imaged by a virtual cyclopean camera arrangement;

FIG. 5 shows a schematic diagram of the scene shown in FIG. 1 being imaged by a camera arrangement according to a second embodiment of the present invention;

DETAILED DESCRIPTION

Figure 3:
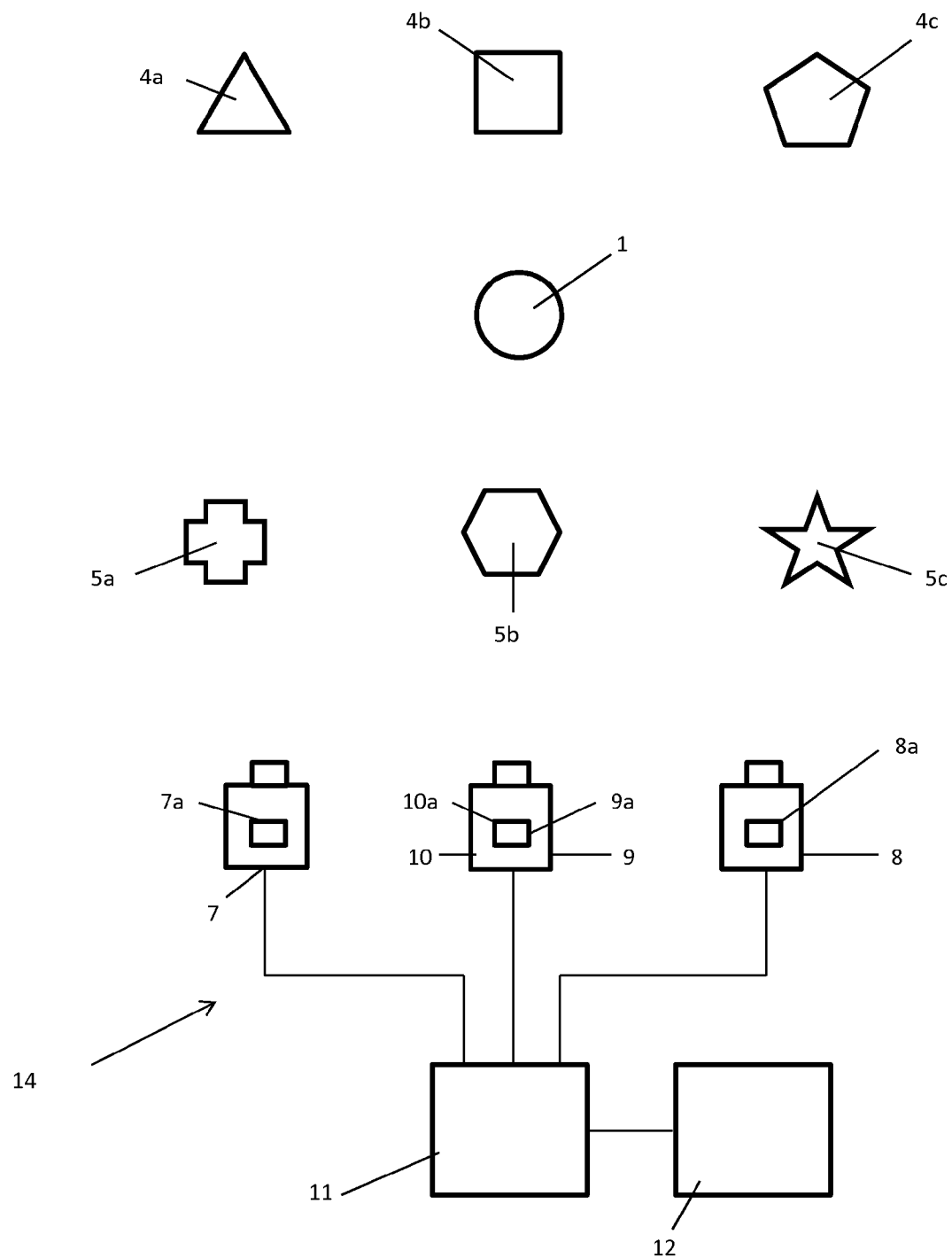
FIG. 3 shows a schematic diagram of the scene shown in FIG. 1 being imaged by a camera arrangement according to a first embodiment of the present invention.

FIG. 1 shows a schematic diagram of a scene being imaged by separate visible light and infrared cameras, and is used here to exemplify the parallax problem.

As shown in FIG. 1, an object of interest 1 is present within a scene visible in the fields of view of both a visible light camera 2 and an infrared camera 3. The object of interest 1 is shown as a circle. Also in the scene visible to the two cameras 2 and 3, in the background there are a number of background objects 4a to 4c, comprising a triangle 4a, a square 4b and a pentagon 4c. In the foreground there are a number of foreground objects 5a to 5c, which are represented as a cross 5a, a hexagon 5b, and a star 5c. From the perspective of the visible light camera 2 the object of interest 1 appears to be positioned between the square 4b and the pentagon 4c in the background, and also appears to be positioned between the cross 5a and the hexagon 5b in the foreground. However from the perspective of the infrared camera 3 the object of interest 1 appears to be positioned between the triangle 4a and the square 4b in the background and also appears to be positioned between the hexagon 5b and the star 5c in the foreground.

This represents an extreme case of the parallax problem, and in practice it may be possible for the visible and infrared cameras 2 and 3 to be positioned relatively close to one another, so that their different viewpoints are close to each other, resulting in a viewed object scene appearing similar even when viewed from the different viewpoints of the different locations of the visible light and infrared cameras 2 and 3. However, even in this case, although the parallax problem may be reduced it still exists.

This parallax effect can cause noticeable problems when the images from the visible light camera 2 and the infrared camera 3 are combined, where for example the resultant combined image can be distorted leading to an effect similar to the imaging system formed by the two cameras 2 and 3 suffering from 'double vision'. As a result of the images produced by the two cameras being different because of parallax effects, if the images from the two cameras are overlaid in correct alignment at a particular object of interest in the image, this distortion effect becomes increasingly large, and so increasingly apparent, for objects of increasing depth separation away from the depth position of the particular object. That is, the distortion effect becomes increasingly large as the distance of the object from the cameras 2 and 3, becomes increasing different from the distance of the object of interest, both toward (objects 5a, b, c) the cameras 2 and 3 and away (objects 4a, b, c) from the cameras 2 and 3.

In practice, where there is an object of interest visible, the images from the cameras 2 and 3 will commonly be overlaid in correct alignment at the object of interest, so that the distortion effect will become increasingly large and apparent for objects of increasing depth separation away from the object of interest.

A parallax based problem similar to the above will also relate to individual objects themselves when those objects have a significant depth extending away and toward the cameras, where the images from the cameras 2 and 3 will be differently aligned for parts of an object at different depth positions.

The problem of parallax disappears for objects at long distances, and in particular at the long distances generally referred to in optics as being at infinity, but becomes an ever increasing problem as objects move closer to the two cameras. Corrective measures that are applied generally need to know the distance to the object of interest. A problem is that in general any correction only properly applies for objects at a particular distance from the cameras, and objects further away from or closer to the cameras will have an incorrect correction applied. Similarly, such an incorrect correction will also be applied to different parts of the object of interest itself when it has a significant depth within the scene.

FIG. 2 shows a schematic diagram of the scene shown in FIG. 1 being imaged by a virtual cyclopean camera arrangement.

In the illustrated example of FIG. 2 a virtual cyclopean camera 6 is formed by combining the image outputs of two spaced apart cameras 2 and 3 to provide a cyclopean image. By using appropriate processing the images produced by the two cameras 2 and 3 can be combined to produce a cyclopean image which appears to have been produced from the viewpoint of the virtual cyclopean camera 6 that is situated between the two cameras 2 and 3, as shown in FIG. 2. The necessary processing required in any particular case can be readily carried out by the skilled person using known techniques, and need not be discussed in detail. In one example, each camera 2 and 3 has a respective sensor.

Each camera 2 and 3 provides a slightly different view of the scene, where the view of the scene from each of the cameras 2 and 3 is detected by the corresponding sensor in each camera 2 or 3. Through appropriate processing the images from the two sensors are combined to provide a cyclopean image that appears as if it has been produced from the virtual cyclopean camera 6 located between the actual positions of the cameras 2 and 3. The cyclopean image appears to have been generated on a virtual sensor within the virtual cyclopean camera 6. The position of the virtual sensor of the virtual cyclopean camera 6 is situated midway between the sensors of each of the two cameras 2 and 3 making up the virtual cyclopean camera arrangement.

In other examples the position of the virtual sensor of the virtual cyclopean camera may be arranged to be at a location which is not midway between the sensors of the two cameras making up the virtual cyclopean camera arrangement. The location of the sensor of the virtual camera can be selected to be any desired location, and the skilled person will be able to carry out the necessary image combination processing to do this without difficulty. However, arranging the virtual sensor of the virtual cyclopean camera at a position midway between the sensors of the two cameras may provide advantages of simplifying the processing required to combine the images from the two cameras into a virtual cyclopean image and/or reducing problems due to objects visible in the image from one camera not being visible in image from the other camera.

FIG. 3 shows a schematic diagram of the scene shown in FIG. 1 being imaged by a multispectral camera arrangement 14 according to a first embodiment of the present invention.

In the illustrated example of FIG. 3 the multispectral camera arrangement 14 comprises a virtual cyclopean camera arrangement 13, which is formed by two spaced apart visible light imaging cameras 7 and 8 and an image combiner 11. In the virtual cyclopean camera arrangement 13 a virtual cyclopean visible light camera 9 is formed by combining the image outputs of two spaced apart visible light cameras 7 and 8 operating over visible light bandwidths by the image combiner 11 to provide a visible light cyclopean image. The two visible light images produced by the two visible light cameras 7 and 8 are combined by the image combiner 11 to produce a cyclopean visible light image which appears to have been produced from the viewpoint of the virtual visible light cyclopean camera 9 that is situated centrally between the two spaced apart visible light cameras 7 and 8.

In one example, the visible light camera 7 has a visible light image sensor element 7a, and the visible light camera 8 has a visible light image sensor element 8a. In one example the visible light sensor elements 7a and 8a of the respective visible light cameras 7 and 8 each incorporate a two dimensional detector array, such as a CCD or CMOS chip. In other examples, other array technologies can be used.

Each visible light camera 7 and 8 provides a slightly different view of the scene, where the view of the scene from each of the visible light cameras 7 and 8 is detected by the corresponding sensor in each visible light camera 7 or 8. The images from the two sensors are combined by the image combiner 11 to provide a visible light cyclopean image that appears as if it has been produced from the virtual cyclopean visible light camera 9 located between the actual positions of the visible light cameras 7 and 8. The cyclopean visible light image appears to have been generated on a virtual visible light image sensor element 9a within the virtual visible light cyclopean camera 9. The position of the virtual visible light sensor element 9a of the virtual visible light cyclopean camera 9 is situated between the visible light sensor elements 7a and 8a of each of the two visible light cameras 7 and 8 making up the virtual cyclopean camera arrangement. The exact position of the virtual image plane, equating to the position of the virtual sensor element 9a of the virtual cyclopean camera 9, can be readily determined by the person skilled in the art.

Referring to FIG. 3, the multispectral camera arrangement 14 further comprises an infrared (IR) imaging camera 10, which is positioned between the two visible light imaging cameras 7 and 8 at the same, or substantially the same, position as the virtual position of the virtual cyclopean visible light camera 9. The infrared camera 10 then sees the scene from the same, or substantially the same, viewpoint as the apparent virtual viewpoint of the virtual cyclopean visible light camera 9. In some examples, the infrared camera 10 has an infrared image sensor element 10a incorporating a two dimensional detector array, such as a HgCdTe, Lead based, or Indium based, or bolometer material array. Other array technologies can be used. The infrared sensor element 10a of the infrared imaging camera 10 is positioned between the visible light sensor elements 7a and 8a of the two visible light cameras 7 and 8 at the same, or substantially the same, position as the virtual position of the virtual visible light sensor element 9*a* of the virtual cyclopean visible light camera 9. Accordingly, the infrared sensor element 10*a* of the infrared imaging camera 10 is positioned at, or close to, the virtual imaging plane of the virtual cyclopean visible light camera 9.

In one example the two visible light cameras 7 and 8 forming the virtual cyclopean camera arrangement are in separate housings, thereby enabling the infrared camera 10 to be positioned at the appropriate position.

The visible light cyclopean image produced from the image outputs of the two visible light cameras 7 and 8, which cyclopean image appears to be from the virtual visible light cyclopean camera 9, and the infrared image from the infrared camera 10 are combined by the image combiner 11 to produce a combined infrared and visible light multispectral image. Since the infrared camera 3 is located at the same, or similar, position as the virtual position of the virtual cyclopean camera 6, any possible parallax problems may be reduced or eliminated. Since the infrared and visible light images which are being combined are, in effect, being viewed from the same position in space, that is the actual view position of the infrared image and the apparent virtual view position of the cyclopean visible light image are the same position in space, there is a reduced, or no, parallax problem in relation to objects lying at different distances from the different cameras, and furthermore there is a reduced, or no, parallax problem for different parts of an object of interest.

Figure 4:
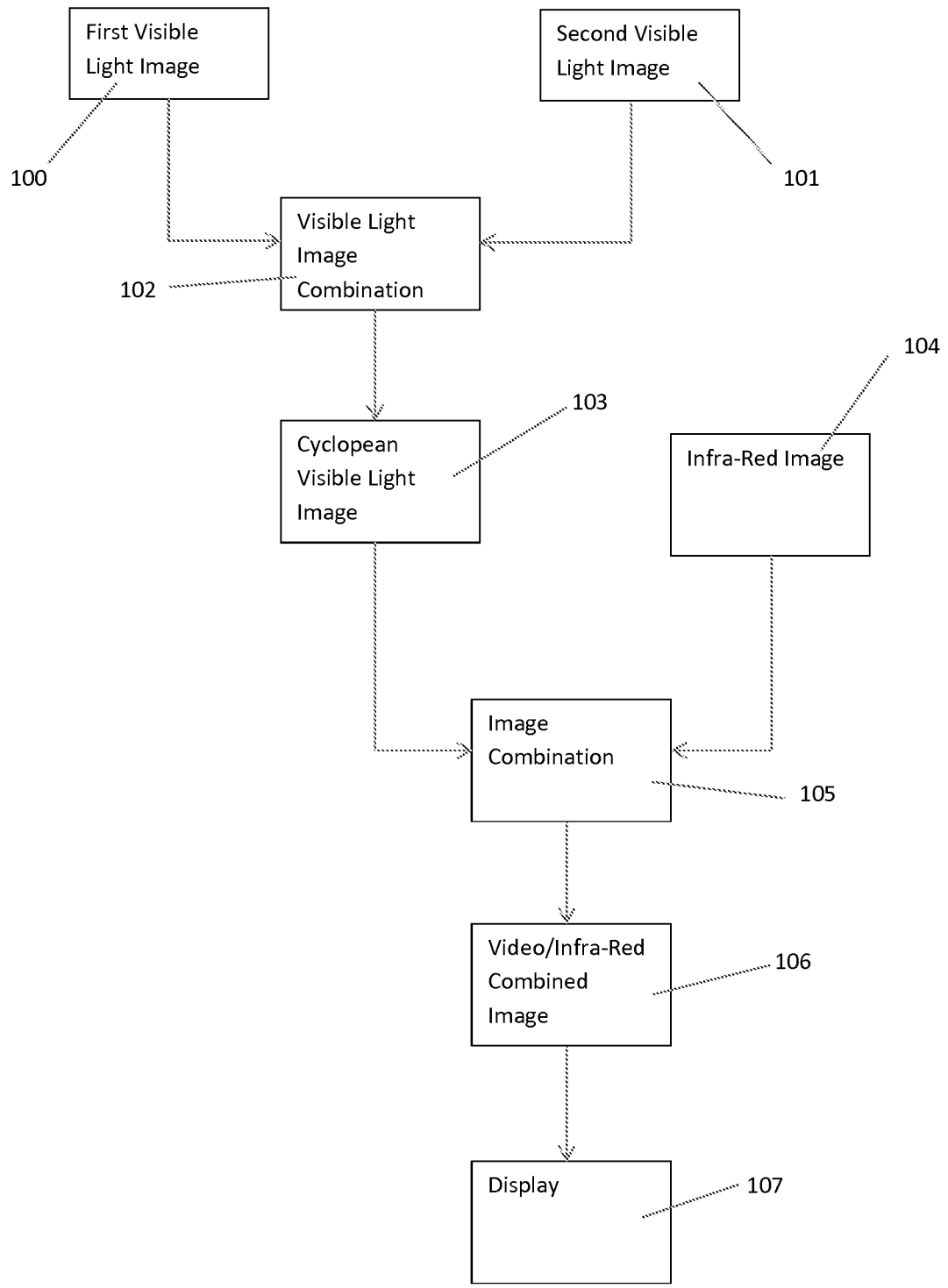
FIG. 4 shows a flow diagram of a method of the first embodiment of the present invention.

FIG. 4 shows a flow diagram of a method according to the first embodiment of the present invention, further describing the apparatus and method by which parallax may be corrected for combined visible and infrared images of a scene.

The two visible light images from the two visible imaging light cameras 7 and 8 forming the virtual visual light cyclopean camera arrangement 14, referred to as the first visible light image 100 and the second visible light image 101 respectively, are combined by the image combiner 11 in a visible light image combination step 102 to provide a cyclopean visual light image 103. As described above, this cyclopean visual light image 103 appears to have come from a virtual visible light cyclopean camera 9 that has viewed the scene from a central position between the actual positions of the two visible light cameras 7 and 8.

Further, an infrared image 104 of the scene is obtained from the imaging infrared camera 10. In the illustrated example the infrared camera 10 operates over the thermal infrared wavelength range. In some examples the infrared camera 10 operates over the mid infrared wavelength range, to the extent that this definition differs to that of the thermal wavelength range. In some examples the infrared camera 10 operates over the near infrared wavelength range. In some examples the infrared camera 10 operates over the long infrared wavelength range.

The cyclopean visual light image 103 and infrared image 104 are then combined by the image combiner 11 in an image combination step 105 to provide a combined visible and infrared multispectral image 106. The infrared image information of the infrared image 104 is represented in the combined multispectral image 106 by false colours corresponding to different temperatures, as is well known. In other examples other known methods of representing infrared image information may be used.

The combined visible light and infrared multispectral image 106 is then presented for display on a visual display unit (VDU) 12 in a display step 107. Instead of, or in addition to, being displayed the combined visible light and infrared image may be recorded for future display.

In the image combination step 105 the cyclopean visible light image 103 and the infrared image 104 are combined at the same or substantially the same magnification or zoom, such that when combined the features within the scene at visible light and infrared wavelengths correlate, so that the visible light and infrared parts of the combined image 106 effectively overlie one another and are correctly aligned.

In some examples, to further facilitate the image combining processing undertaken by the image combiner, the respective detector making up the visible light sensor elements 7*a* and 8*a* of the two visible light cameras 7 and 8 and the infrared sensor element 10*a* of the infrared camera 10 can be arranged and chosen such that each detector comprises a respective detector array and the number of pixels of each detector array along an axis, or both orthogonal axes, of the detector array is the same, or are related by an integer ratio, that is, are divisible one by the other to provide an integer number.

In some examples the image combiner 11 carrying out the image combination may modify the visible and/or infrared images such that the number of pixels in each image in orthogonal image axes is the same, or are related by an integer ratio.

Normal image representation techniques can be used for the infrared part of the combined image. For example, false colours may be used in the combined image 106 to represent the temperatures of objects within the viewed scene.

In examples where the images are digital images the image combiner may be an image processor.

In the illustrated examples the combination of the two visible light images to form the cyclopean image and the combination of the cyclopean image with the infrared image are carried out by the same image processor. In other examples separate dedicated image processors may be used to carry out the different combinations.

In the illustrated example the virtual cyclopean camera is a virtual visible light cyclopean camera formed by two visible light cameras, and the visible light cyclopean image is combined with an infrared image from an infrared camera. In other examples this arrangement may be reversed so that the virtual cyclopean camera is a virtual infrared cyclopean camera formed by two infrared cameras, and the infrared cyclopean image is combined with a visible light image from a visible light camera.

In the illustrated example imaging cameras are used. In other examples other types of imaging sensor may be used.

FIG. 5 shows a schematic diagram of the scene shown in FIG. 1 being imaged by a multispectral camera arrangement 20 according to a second embodiment of the present invention.

In the illustrated example of FIG. 5 the multispectral camera arrangement 20 comprises a virtual cyclopean camera arrangement 13 and an infrared imaging camera 10 as described above regarding the first embodiment, which are used to provide a combined infrared and visible light multispectral image.

The multispectral camera arrangement 20 further comprises a depth or distance sensor, which in this example is a structured light scanner 21. The structured light scanner 21 projects a light pattern of parallel bright and dark fringes and scans this projected light pattern across the scene viewed by the virtual cyclopean camera arrangement 13 and the infrared imaging camera 10.

When the scanned fringes are projected onto objects or surfaces in the viewed scene the appearance of the fringes is distorted, with the distortions depending on the locations of the objects or surfaces. Accordingly, by viewing the projected pattern of fringes and analysing their appearance it is possible to determine the locations in three dimensions of the objects or surfaces onto which the fringes are projected. The principles of the use of structured light scanning to obtain three dimensional information are well known to the skilled person and do not need to be discussed in detail herein.

The visible light cameras 7 and 8 of the virtual cyclopean camera arrangement 13 are used to view the light pattern projected by the structured light scanner 21 and the images from the visible light cameras 7 and 8 are provided to a three dimensional modelling unit 22 in addition to the image combiner 11.

The three dimensional modelling unit 22 uses the images of the projected light pattern received from the visible light cameras 7 and 8 to generate a three dimensional model of the objects and surfaces in the viewed scene.

The three dimensional model from the three dimensional modelling unit 22, the visible light cyclopean image 103 from the image combiner 11, and the infrared image 104 from the infrared camera 10 are supplied to a raycaster unit 23. The raycaster unit 23 raycasts the visible light cyclopean image 103 and the infrared image 104 onto the three dimensional model to overlay the visible light cyclopean image 103 and the infrared image 104 onto the three dimensional model and produce a three dimensional model of the viewed scene augmented with both visible light and infrared information.

Using the two visible light cameras 7 and 8 forming the virtual cyclopean camera assembly 13 to view projected structured light pattern is convenient when the virtual cyclopean camera assembly 13 is being used because these two visible light cameras 7 and 8 are already present so that the cost of additional cameras can be avoided. Further, using the images from these two cameras 7 and 8 to generate the three dimensional representation of the scene has the advantage that because the infrared camera 10 is at the position of the virtual central cyclopean camera 9 as discussed above, the information on which the three dimensional model is based will have been acquired from the same viewpoint as that used to acquire both the cyclopean visible light image 103 and the infrared image 104, so avoiding possible parallax or viewpoint problems.

Figure 6:
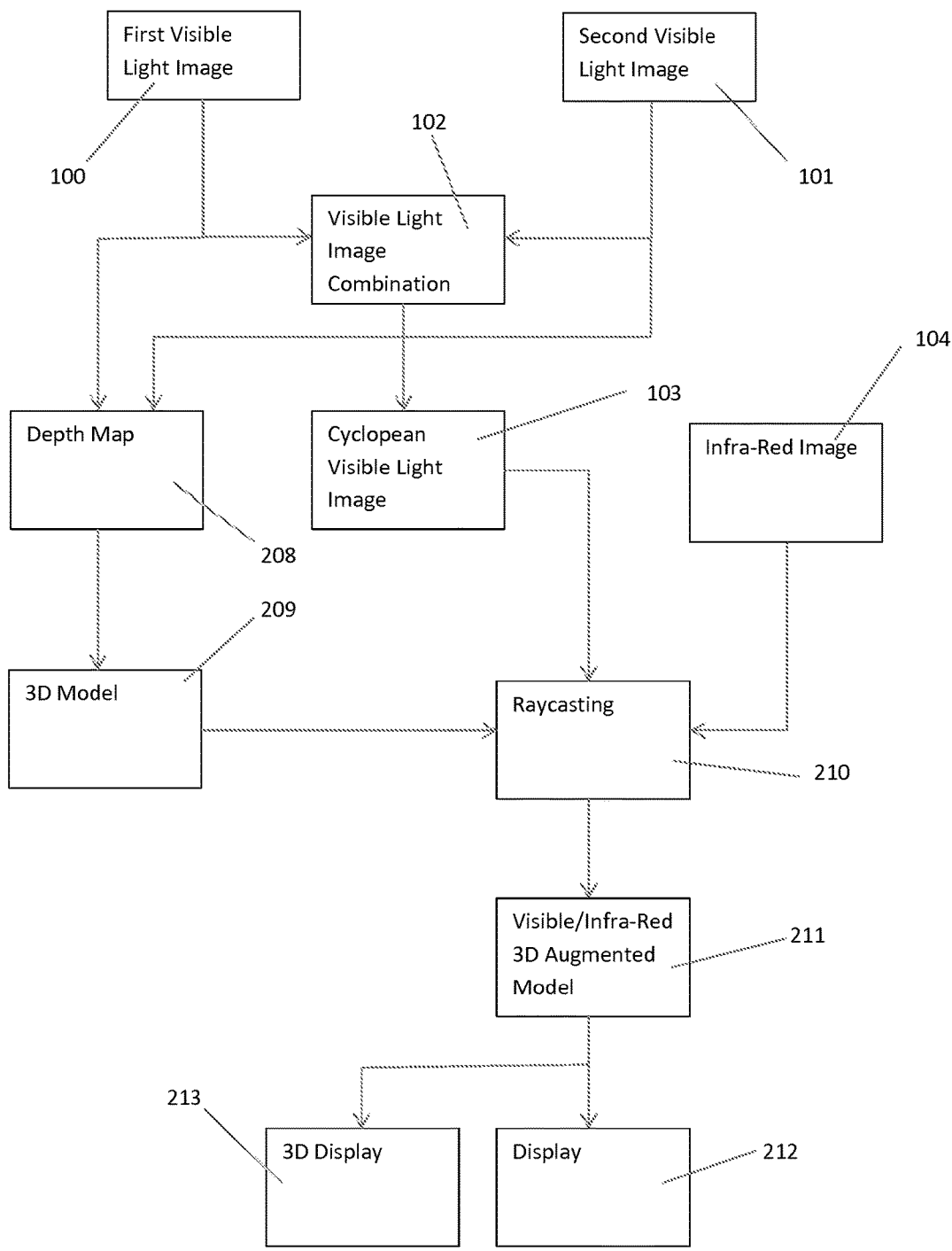
FIG. 6 shows a flow diagram of a method of a second embodiment of the present invention.

FIG. 6 shows a flow diagram of a method according to the second embodiment of the present invention, further describing an apparatus and method for three dimensional overlaying of visible and infrared images of a scene.

In the illustrated example of FIG. 6, a three dimensional representation of the scene is obtained, from which a three dimensional model of objects within the scene is produced.

In the illustrated example of FIG. 6 the first visible light image 100 and the second visible light image 101 from respective ones of the two visible imaging light cameras 7 and 8 forming the virtual visual light cyclopean camera arrangement 13, are combined by the image combiner 11 in a visible light image combination step 102 to provide a cyclopean visual light image 103. As described above, this cyclopean visual light image 103 appears to have come from a virtual visible light cyclopean camera 9 that has viewed the scene from a central position between the actual positions of the two visible light cameras 7 and 8.

In the illustrated example of FIG. 6, in addition to being used to form the cyclopean visible light image 103 the first and second visible light images 100 and 101 are supplied to the three dimensional modelling unit 22 and used to determine three dimensional information of the scene. The first and second visible light images 100 and 101 are used by the three dimensional modelling unit 22 to produce a depth map 208 of objects in the scene. The three dimensional modelling unit 22 then uses the depth map 208 to produce a three dimensional model 209 of the viewed scene.

As in the first embodiment, an infrared camera 10 is used to provide an infrared image 104 of the scene. In one example this may be a thermal infrared image of the scene. In the illustrated example the infrared camera 10 operates over the thermal infrared wavelength range. In some examples the infrared camera 10 operates over the mid infrared wavelength range, to the extent that this definition differs to that of the thermal wavelength range. In some examples the infrared camera 10 operates over the near infrared wavelength range. In some examples the infrared camera 10 operates over the long infrared wavelength range.

As shown in FIG. 6, the cyclopean visible light image 103, and the thermal infrared image 104 are overlaid, individually and/or after having been combined, onto the three dimensional model 209 of the scene by the raycaster unit 23 in a raycasting step 210.

During the raycasting step 210 the infrared image 104 is raycast onto the three dimensional model 209. Thus, infrared texture can be created on objects within the imaged scene. This can provide a three dimensional model of the scene augmented with thermal information.

During the raycasting step 210, the cyclopean visible light image 103 is raycast onto the three dimensional model 109. Thus, visible texture can be created on objects within the imaged scene, which may be at an increased level of resolution to that of the infrared texture. This can provide a three dimensional model of the scene augmented with visible information.

Thus, a combined visible light and infrared three dimensional augmented model 211 of the scene can be provided augmented with both visible and thermal information. This augmented three dimensional model 211 can be presented to a display such as a VDU 12 in a display step 212, and/or displayed on a three dimensional display in a display step 213.

According to this embodiment, the visible and infrared images can be combined within a three dimensional representation or model 211 of the imaged object scene, as opposed to a conventional two dimensional representation of the imaged object scene. The combined three dimensional visible and infrared augmented model 211 can then be manipulated spatially, thereby enabling further information about the imaged scene to be determined.

In other examples, other methods could be used to combine the visible and infrared images with the 3D model instead of raycasting.

In the illustrated example two cameras are used to view the projected structured light pattern. In other examples a different number of cameras may be used. In some examples only one camera may be used.

In the illustrated example, the two cameras used to view the projected structured light pattern are the two cameras of the virtual cyclopean camera that is used to generate the visible light image of the viewed scene. In other examples the structured light scanner and the virtual cyclopean camera may use different cameras.

In the illustrated example, the depth or distance sensor comprises a structured light scanner which uses structured light information to obtain location information regarding objects and surfaces in the viewed scene.

In an alternative example, the depth or distance sensor may comprise a processor comparing the first and second visible light images and using stereoscopic techniques to determine the depth or distance of objects and surfaces in the viewed scene from the differences between the first and second visible light images.

In other examples location information of the scene may be determined by other means, for example ultrasonic ranging, laser radar (IADAR/IIDAR) or standard RADAR, in place of the structured light scanning.

The illustrated example generates a depth map, and then uses the depth map to produce a three dimensional model of the viewed scene. In other examples other methods of producing a three dimensional model which do not require the generation of a depth map may be used.

Figure 7:
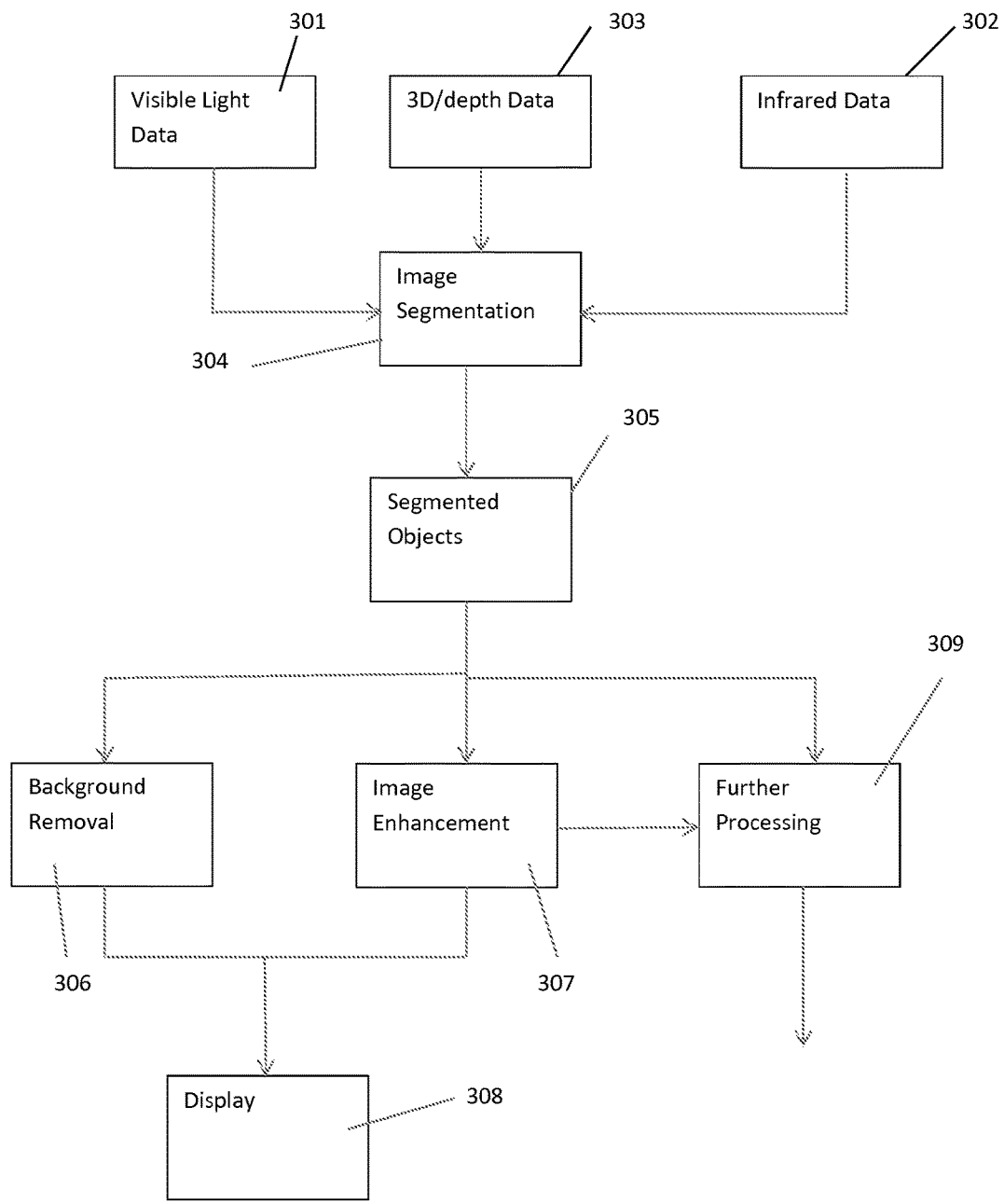
FIG. 7 shows a flow diagram of a further method of the second embodiment of the present invention.

FIG. 7 shows a flow diagram of a further example of the present invention, where the possible spatial manipulation referred to above with reference to the previous example is undertaken.

As is discussed below infrared images may suffer from a limited displayable contrast of dynamic range with respect to objects within the scene, and it may be advantageous to increase the proportion of the displayable dynamic range associated with images of objects of interest. Additionally, it can be useful to select objects within an imaged scene for further analysis. Furthermore, the selection of objects may allow for the removal of clutter within the imaged scene, for easier comprehension of the imaged scene. The illustrated method of FIG. 7 may facilitate these aspects.

A scene being imaged both within the visible and/or infrared wavelength range may contain a range of objects but only a selection of these imaged objects may be of interest.

Within the imaged scene there may be a range of objects of different detected temperatures. Some objects may be very hot, and/or some objects may be very cold, or there may be both very hot and very cold objects within the scene. The object or objects of interest within the imaged scene may have temperatures that only extend over a part of the total range of temperatures observable within the scene, for example if the hottest and/or coldest objects visible in the scene are background objects which are not actually objects of interest. This may result in the display of temperature information regarding the objects of interest being obscured.

For example, if false colours are used to indicate temperature information regarding objects within a viewed scene and the scene has a total temperature range of 100K, with an available palette of 20 false colours to be used to represent these temperatures, then the temperature range represented by one false one colour would be approximately 5K. However, the objects of interest within the scene might only have temperatures extending across a temperature range of only 10K so that only 2 or 3 colours will be used to represent these temperatures, so that there is a limited effective dynamic range of displayable temperatures for the objects of interest. In such a situation, the effective displayable dynamic range of the infrared imaging camera with respect to the objects of interest has been compromised, even though the infrared camera itself may be able to resolve temperatures across the objects of interest at a temperature resolution better than 5K or indeed significantly better than 5K.

As shown in FIG. 7 visible image data or visible light data 301, infrared data 302 and three dimensional or depth information 303 are processed by a processor using an image segmentation algorithm in an image segmentation step 304 to produce segmented object information 305 in which objects located at different depths, that is distances from the imaging cameras, within the viewed scene are identified.

One form of manipulation of the three dimensional visible/infrared image is to carry out image segmentation using depth information.

In a background removal step 306 objects located beyond a specified maximum depth can be removed from the image. This maximum depth may be fixed, or may be based on the depth of an object of interest identified in the image. For example, the maximum depth may be a fixed amount above the depth of an identified object of interest, or a fixed multiple of the depth of an identified object of interest. This removal of background objects may reduce clutter and make the image more readily understandable.

In other examples a foreground removal step may be carried out in addition to, or as an alternative to, the background removal step. In the foreground removal step, objects located at less than a specified minimum depth can be removed from the image. This minimum depth may be fixed, or may be based on the depth of an object of interest identified in the image. For example, the minimum depth may be a fixed amount less than the depth of an identified object of interest, provided this is more than zero, or a fixed fraction of the depth of an identified object of interest. This removal of foreground objects may reduce clutter and make the image more readily understandable.

An object of interest can be selected within an image during post-processing, or an object of interest can be selected in real time through for example the imaging system (visible and/or infrared cameras) being focussed at the distance of the object of interest. Other means of selecting objects of interest will be apparent to the person skilled in the art, such as cursor or icon selection of objects or using a touch screen to select objects of interest for example, or laser ranging. Other means of selecting objects of interest in real time will be apparent to the person skilled in the art.

In real time, the focusing arrangement of the camera(s) can be used to determine a range of interest from the camera(s). This range of interest can be the range at which the object or objects of interest are located. In other examples the range of interest may be a band of ranges extending to either side of the depth of the object or objects of interest. In one example the range of interest may be a band of ranges centred on the depth of the object or objects of interest.

In an image enhancement step 307 the segmented object information 305 can be used to mask-off, hide, or remove objects in the scene that are not at this range of interest from the cameras. In some examples these objects may not be displayed at all in the enhanced image. In other examples these objects may be displayed in the enhanced image as visible light images only without any thermal information.

Where false visible colours are used to represent temperature in the infrared data 302, the infrared data 302 regarding the objects still represented in the image enhanced scene may be provided with enhanced temperature contrast. This may be possible where the masked off, hidden or removed objects in the foreground or background were hotter or colder than the still represented objects at the range of the object of interest The available palette of false colour used to represent temperature data can then be used to extend only over the smaller range of temperatures observable at the range of interest, where the object of interest is located, rather than the full range of temperatures in the full imaged scene, where for example a hot object in the background could lead to reduced palette colour resolution over the object of interest.

After image enhancement and/or background removal the resulting image may be displayed on a display 212 or 213 in a display step 308.

The segmented object information 305 and/or the enhanced image data produced by the image enhancement step 307 may be used in further processing 309. Such further processing may, for example, include processing for object tracking, automatic fault detection, and the like.

In some examples, objects can be selected in order that they are masked, removed, or hidden, with the remaining objects within the scene then forming the objects of interest.

In some examples objects at a number of different ranges within the object scene can be selected in order that they are masked, removed, or hidden.

During post-processing a specific object can be selected to further enhance contrast with respect to other objects at that range and allow enhancement algorithms such as high dynamic range algorithms to be used. Similarly, in real time such specific image selection and imaging processing could be provided for.

In some examples, three dimensional or depth information and infrared image data are processed. In other examples, three dimensional or depth information and combined visible light and infrared image data are processed.

In the illustrated examples two visible light images from two cameras are used to form the cyclopean image. In other examples three or more visible light images from three or more cameras are used to form the cyclopean image.

In some examples the cyclopean camera operates with two infrared cameras that are used to obtain a cyclopean infrared image. In some examples the cyclopean camera operates over the thermal infrared wavelength range. In some examples the cyclopean camera operates over the mid infrared wavelength range, to the extent that this definition differs to that of the thermal wavelength range. In some examples the cyclopean camera operates over the near infrared wavelength range. In some examples the cyclopean camera operates over the long infrared wavelength range.

In some examples, a camera operating over visible wavelengths is positioned between the two infrared cameras of the infrared cyclopean camera.

In some examples the visible imaging cameras forming the cyclopean camera are contained within a single housing. In some examples the infrared imaging camera is also contained within the same housing.

In some examples the image combiner 11 carrying out the image combination may modify the visible and/or infrared images such that the number of pixels in each image in orthogonal image axes is the same, or are related by an integer ratio.

Normal image representation techniques can be used for the infrared part of the combined image. For example, false colours may be used in the combined image 106 to represent the temperatures of objects within the viewed scene.

In examples where the images are digital images the image combiner may be an image processor.

In the illustrated example of the second embodiment the visible light images from the visible light cameras are supplied directly to the three dimensional modelling unit, In other examples these may be supplied through the image combiner 11.

The features disclosed in the different embodiments discussed above and the alternatives are not exclusive. Therefore, features in any or all of the embodiments and alternatives may be exchanged and/or combined if desired.

The apparatus described above may be implemented at least in part in software. Those skilled in the art will appreciate that the apparatus described above may be implemented using general purpose computer equipment or using bespoke equipment. The hardware elements, operating systems and programming languages of such computers are conventional in nature, and it is presumed that those skilled in the art are adequately familiar therewith.

Those skilled in the art will appreciate that while the foregoing has described what are considered to be the best mode and, where appropriate, other modes of performing the invention, the invention should not be limited to specific apparatus configurations or method steps disclosed in this description of the preferred embodiment. It is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Those skilled in the art will recognize that the invention has a broad range of applications, and that the embodiments may take a wide range of modifications without departing from the inventive concept as defined in the appended claims.

The invention claimed is:

1. Apparatus for imaging, comprising:
a representation generator arranged to generate a three dimensional representation of a scene;
an image segmentation process arranged to identify objects located at different depths in the scene;
at least one visible light imaging sensor arranged to obtain a visible light image of the scene;
at least one infrared imaging sensor arranged to obtain an infrared image of the scene; and
an image overlaying processor arranged to:
 overlay the infrared image and the visible light image onto the three dimensional representation of the scene to produce an multispectral three dimensional representation of the scene; and
 manipulate the overlaid infrared image in the multispectral three dimensional representation of the scene according to the depths of the identified objects such that:
the infrared image is not overlaid onto objects in the scene that do not satisfy a predetermined depth requirement so that a palette of false colors used to represent temperature data in the infrared image is adjusted to extend over the range of temperatures observable at objects satisfying the predetermined depth requirement; and
the visible light image is overlaid onto objects in the scene that do not satisfy the predetermined depth requirement.

2. The apparatus of claim 1, wherein the visible light image and the infrared image are combined to provide a combined multispectral image before being overlaid onto the three dimensional representation of the scene.

3. The apparatus of claim 1, wherein the infrared image in the multispectral three dimensional representation of the scene is manipulated by removing objects located at a depth in the scene greater than a first predetermined depth from the representation of the scene.

4. The apparatus of claim 3, the apparatus further comprising means to identify an object of interest in the scene, wherein the first predetermined depth is based on the depth in the scene at which an identified object of interest is located.

5. The apparatus of claim 1, wherein the infrared image in the multispectral three dimensional representation of the scene is manipulated by removing objects located at a depth in the scene smaller than a second predetermined depth from the representation of the scene.

6. The apparatus of claim 1, wherein the infrared image in the multispectral three dimensional representation of the scene is manipulated by selectively overlaying the infrared image onto objects in dependence on the depths at which the objects are located in the three dimensional representation of the scene.

7. The apparatus of claim 1, the apparatus further comprising means to identify an object of interest in the scene, and wherein the predetermined depth requirement is satisfied by depths that are within a range of depths extending to either side of the location of an identified object of interest.

8. The apparatus of claim 7, wherein the range of depths are centred on the location of an identified object of interest.

9. The apparatus of claim 1, wherein the at least one visible light imaging sensor comprises at least two spaced apart imaging sensors arranged to form a cyclopean camera arrangement; and the apparatus further comprises an image combiner arranged to combine images from the at least two spaced apart imaging sensors to provide a first cyclopean image of a scene from a virtual first position.

10. The apparatus of claim 9, wherein the at least one infrared imaging sensor provides a second image of the scene from a second position; and the first virtual position and the second position of the at least one infrared imaging sensor are arranged to be substantially the same.

11. The apparatus of claim 9, wherein the representation generator comprises a processor which compares the images from the at least two spaced apart imaging sensors and uses stereoscopic techniques to determine the depths and/or distances.

12. The apparatus of claim 1, wherein the representation generator comprises a structured light scanner.

13. The apparatus of claim 12, wherein the at least one visible light imaging sensor views structured light projected by the structured light scanner and provides information regarding the viewed structured light to the representation generator.

14. The apparatus of claim 1, wherein overlaying the infrared image onto the three dimensional representation of the scene comprises raycasting the visible image onto the three dimensional representation of the scene.

15. An imaging method, comprising:
generating a three dimensional representation of a scene using a representation generator; identifying objects located at different depths in the scene using an image segmentation process;
obtaining an infrared image of the scene using at least one infrared imaging sensor;
obtaining a visible light image of the scene using at least one visible light imaging sensor;
overlaying the infrared image and the visible light image onto the three dimensional representation of the scene to produce an multispectral three dimensional representation of the scene using an image overlaying processor; and manipulating the infrared image in the multispectral three dimensional representation of the scene according to the depths of the identified objects such that:
the infrared image is not overlaid onto objects in the scene that do not satisfy a predetermined depth requirement so that a palette of false colors used to represent temperature data in the infrared image is adjusted to extend over the range of temperatures observable at objects satisfying the predetermined depth requirement; and
the visible light image is overlaid onto the objects in the scene that do not satisfy the predetermined depth requirement.

16. The method of claim 15, wherein the visible light image and the infrared image are combined to provide a combined multispectral image before being overlaid onto the three dimensional representation of the scene.

17. The method of claim 15, wherein manipulating the infrared image in the multispectral three dimensional representation of the scene comprises removing objects located at a depth in the scene greater than a first predetermined depth from the representation of the scene.

18. The method of claim 17, the apparatus further comprising means to identify an object of interest in the scene, wherein the first predetermined depth is based on the depth in the scene at which an identified object of interest is located.

19. The method of claim 15, wherein manipulating the infrared image in the multispectral three dimensional representation of the scene comprises removing objects located at a depth in the scene smaller than a second predetermined depth from the representation of the scene.

20. The method of claim 15, wherein manipulating the infrared image in the multispectral three dimensional representation of the scene comprises selectively overlaying the infrared image onto objects in dependence on the depths at which the objects are located in the three dimensional representation of the scene.

21. The method of claim 15, the apparatus further comprising means to identify an object of interest in the scene, wherein the predetermined depths are a range of depths extending to either side of the location of an identified object of interest.

22. The method of claim 21, wherein the range of depths are centred on the location of an identified object of interest.

23. The method of claim 15, wherein the at least one visible light imaging sensor comprises at least two spaced apart imaging sensors arranged to form a cyclopean camera arrangement; and
the method further comprises using an image combiner to combine images from the at least two spaced apart imaging sensors to provide a first cyclopean image of a scene from a first virtual position.

24. The method of claim 23 wherein the at least one infrared imaging sensor provides a second image of the scene from a second position; and
the first virtual position and the second position of the at least one infrared imaging sensor are arranged to be substantially the same.

25. The method of claim 23, wherein the representation generator comprises a processor which compares the images from the at least two spaced apart imaging sensors and uses stereoscopic techniques to determine the depths and/or distances.

26. The method according claim 15, wherein the representation generator comprises a structured light scanner.

27. The method of claim 26, wherein the at least one visible light imaging sensor views structured light projected by the structured light scanner and provides information regarding the viewed structured light to the representation generator.

28. The method of claim 15, wherein overlaying the infrared image onto the three dimensional representation of the scene comprises raycasting the visible image onto the three dimensional representation of the scene.

* * * * *